United States Patent [19]
Johnson

[11] Patent Number: 4,459,529
[45] Date of Patent: Jul. 10, 1984

[54] POWER FACTOR CONTROL CIRCUIT FOR AC MOTORS

[75] Inventor: Lynn S. Johnson, Aurora, Ill.

[73] Assignee: Nordic Controls Co., Del.

[21] Appl. No.: 530,991

[22] Filed: Sep. 12, 1983

Related U.S. Application Data

[63] Continuation of Ser. No. 255,788, Apr. 20, 1981, abandoned, which is a continuation-in-part of Ser. No. 212,327, Dec. 2, 1980.

[51] Int. Cl.³ ............................................. H02P 5/40
[52] U.S. Cl. .................................. 318/729; 318/798; 318/812
[58] Field of Search ...................... 318/798, 729, 812

[56] References Cited

U.S. PATENT DOCUMENTS

| | | | |
|---|---|---|---|
| 4,052,648 | 10/1977 | Nola | 318/729 |
| 4,249,120 | 2/1981 | Earle | 318/805 |
| 4,266,177 | 5/1981 | Nola | 318/729 |
| 4,297,628 | 10/1981 | Hedges | 318/798 |
| 4,298,834 | 11/1981 | Opfer | 318/729 |
| 4,387,329 | 6/1983 | Harlow | 318/729 |
| 4,413,217 | 11/1983 | Green et al. | 318/729 |
| WO80/002895 | 12/1980 | WOX PCT Int'l Appl. | 318/729 |

OTHER PUBLICATIONS

Technical Support Package Relating to Powder Factor Controller, Brief No. MFS-2380, NASA 3-79, "Energy Savings in an Induction Motor Using the 8022 Micro-Controller", Intel Applications Note AP-94, Max 80.
"Improved Power-Factor Controller", NASA Tech. Briefs, Summer 1980, vol. 5, No. 2, MFS-25323.

Primary Examiner—David Smith, Jr.
Attorney, Agent, or Firm—McDougall, Hersh & Scott

[57] ABSTRACT

A power factor control circuit is disclosed which is relatively immune to variation in the current through the winding of the motor. This is accomplished by controlling the triac firing circuits as a function of the zero crossing of motor current. For single phase motors the circuit consists of voltage and current squaring means, the outputs of which are provided through logic gates to a summing amplifier. The output of the summing amplifier is an error voltage proportional to the phase difference between the line voltage and the motor current. A control voltage, generated as a function of the zero crossing of the motor current waveform, causes firing of the triac circuit when the ramp exceeds the value of the error signal.

39 Claims, 18 Drawing Figures

FIG.7A    P.F. ∝ $K_1 e^{K_2 (LOAD)}$

FIG.7B    FEEDBACK ∝ $K_3 LOG(K_4 LOAD)$

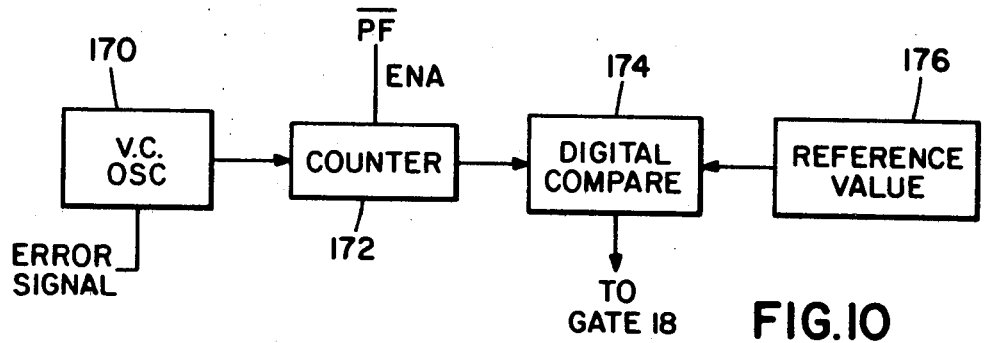
FIG.10
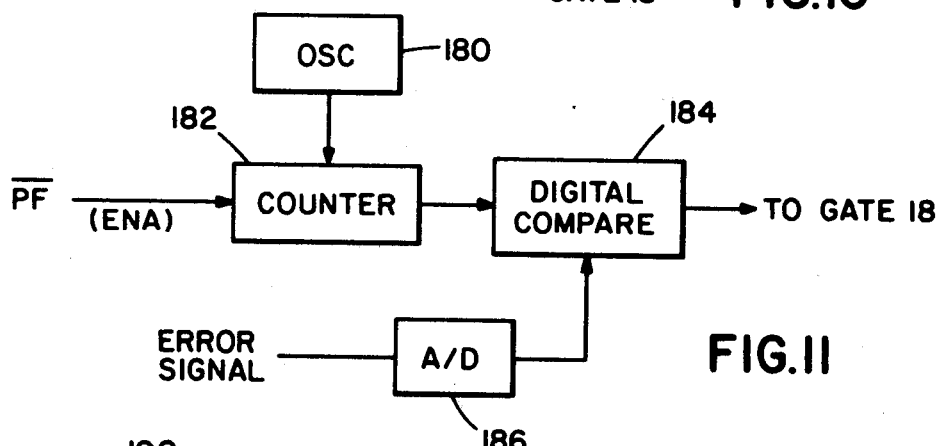
FIG.11
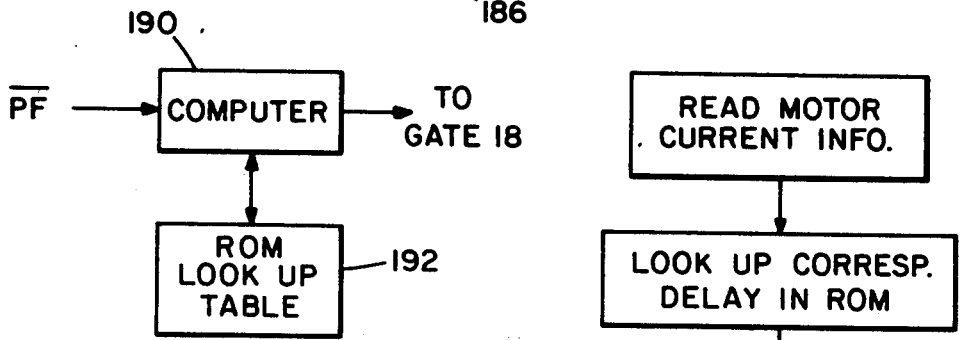
FIG.12
FIG.13
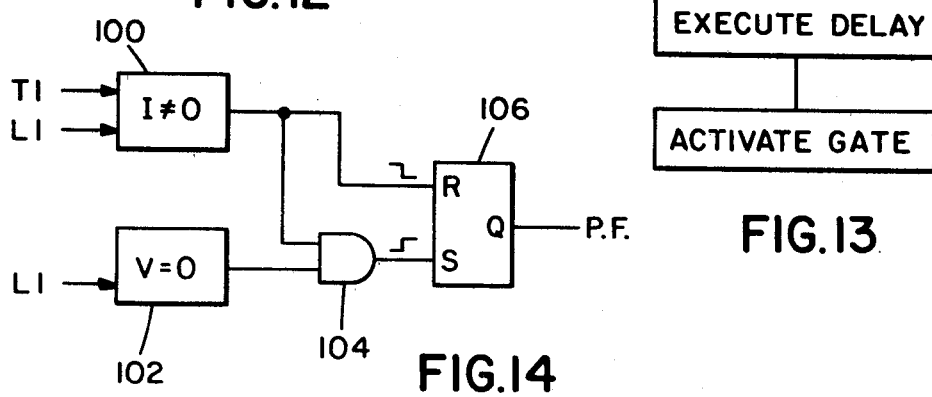
FIG.14

POWER FACTOR CONTROL CIRCUIT FOR AC MOTORS

This is a continuation of application Ser. No. 255,788, filed Apr. 20, 1981 now abandoned, which application is a continuation-in-part of my co-pending application Ser. No. 212,327 filed Dec. 2, 1980.

BACKGROUND OF THE INVENTION

This invention relates to the field of power controls for AC induction motors. More particularly, it relates to the field of power factor control circuits for such motors, the intent of which is to realize energy savings by optimizing the power factor of the motor during normal operation. As is well known, an AC induction motor has its optimum power factor under full load, constant voltage conditions. Many times, however, a motor is operating at other than full load, constant voltage conditions and, accordingly, the power factor is reduced resulting in increased operating cost. In part this is because the motor draws essentially the same current whether fully loaded, partially loaded or unloaded. Therefore, the motor efficiency is less when the rated load is not present.

Because of this situation it is desirable to provide a power factor control circuit for use in conjunction with motors which are frequently operated at other than their rated load. Thus, for example, in the case of a machine tool, such as a drill press, the motor which operates the drill must be large enough to produce the torque imposed during operation of the drill. This full load condition may last for several seconds after which the motor will run in an unloaded condition for significant periods of time before the next drill operation. In such situations, as previously indicated, power factor control can provide significant cost savings and improved efficiency.

Power factor control for AC induction motors is known and, indeed, many circuits have been developed for that purpose. As indicated in the prior art statement, one such prior art control system is disclosed and claimed in U.S. Pat. No. 4,052,648. In that system power factor control is achieved by sampling the line voltage and the current of the induction motor. The samples are compared and a control or error signal representative of their phase difference is obtained. This error signal is employed to vary the duty cycle (on time portion of each AC cycle) for the motor thereby to regulate the phase difference and improve the power factor. In that system, however, control of the duty cycle is a function of the line voltage and hereinafter will be referred to as a voltage delay system.

In theory the prior art power factor control systems of the type disclosed in U.S. Pat. No. 4,052,648, are capable of achieving meaningful improvements in power factor. In practice, however, these systems have not been entirely satisfactory. They fail to account for inherent problem present in AC induction motors, namely, the current through the motor varies even when the line voltage remains constant.

This is due to the impedance characteristics of the motor which is a time variable inductor. Due to its rotation, the motor is inherently variable in its characteristics. Thus, the current through the motor oscillates and causes small speed changes and a corresponding loss of energy savings if not properly controlled. This characteristic, in large part, defeats the energy savings obtained by the prior art power factor control circuits. The losses take the form of motor vibration, excessive operating temperatures, noise, and a possible increase in maintenance requirements.

In the prior art the only way to try and stabilize the power factor circuit against such motor current instability was to utilize large capacitors in the low pass filter section of the circuit to make system response slow. This approach is somewhat disadvantageous for many industrial applications because of the slow response time obtained. Often a quick response system is necessary as, for example, in industrial sewing machines or other machines tools.

Accordingly, it is a principal object of the invention to provide a power factor control circuit which can account for these vagaries in motor current while still obtaining the benefits of power factor control.

It is another object of the invention to provide a power factor control circuit which is relatively insensitive or immune to current variation through the motor while still obtaining all the benefits of power factor control.

A further object of the invention is to provide a power factor control circuit which may be characterized as a current delay system in which the duty cycle employed for power factor control is derived from the motor current.

Another object of the invention is to provide a power factor control circuit with improved energy savings capability by use of a logarithmic feedback circuit.

These and other objects of the invention will become apparent from the detailed description which follows taken in conjunction with the drawings.

SUMMARY OF THE INVENTION

The essence of the present invention is to utilize the motor current waveform to initiate the duty cycle control function of the control circuit. Thus, the ramp or other control signal used for firing the triac circuits is initiated as a function of the motor current going to zero.

This operation solves the major drawback of the voltage delay systems as typified by the aforementioned patent. In the present invention if motor current varies, for example increases, this will delay the start of the next control waveform resulting in a smaller current through the motor during the next half cycle of operation. This corrects the undesirable variation in motor current and thus the system is essentially immune to current variation in the motor. This permits obtaining the intended benefits of power factor control without the offsetting losses due to motor current instability.

The present invention, because it does not utilize large capacitance as part of the low pass filter, can optimize the power factor while still retaining a quick response time. The present invention can correct for motor current instabilities in ½ cycle and over approximately six cycles the average power factor will be correct with the present low pass filter. By comparison, the prior art circuit cannot correct the situation until the error voltage changes.

BRIEF DESCRIPTION OF THE DRAWINGS

FIGS. 7A-D are a waveform diagrams useful in understanding the embodiment of FIG. 6.

FIG. 10 is a fourth embodiment of the invention disclosing the use of a voltage control oscillator, digital counter and comparator to operate the triac gate.

FIG. 11 discloses a fifth embodiment of the invention employing a fixed frequency oscillator and counter in conjunction with a digital comparator to operate the triac gate.

FIG. 12 discloses a sixth embodiment of the invention in which a digital computer is employed in conjunction with a read only memory.

FIG. 13 is a flow diagram useful in understanding the operation of the circuit of FIG. 12.

FIG. 14 is an alternate embodiment of the circuit of FIG. 1 in which the current and voltage digitizing is replaced by difference amplifiers and a flipflop circuit.

DETAILED DESCRIPTION

Figure 1:
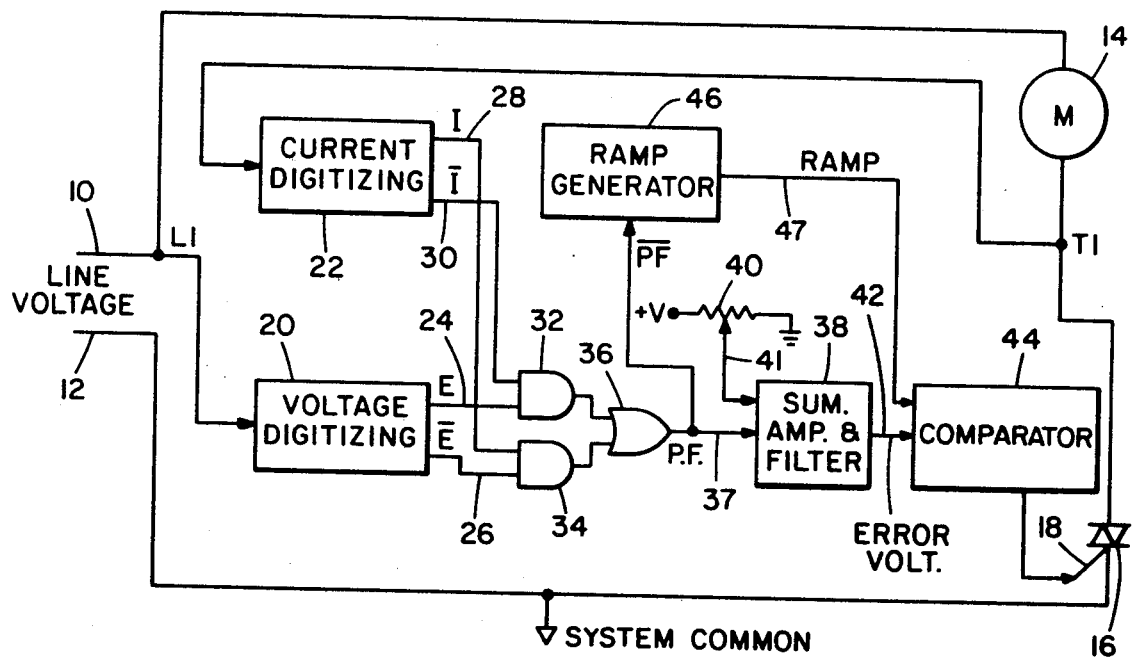
FIG. 1 is a block diagram of a system according to a first embodiment of the invention suitable for controlling a single phase AC motor.

Referring to FIG. 1, the invention according to a first embodiment is illustrated. This embodiment is suitable for use with a single phase AC motor. The line voltage, typically 120 volts AC, is applied to the motor and the control circuit on lines 10 and 12. Line 10 is connected directly to the motor 14 while line 12 is connected to the motor via a triac 16 having a gate electrode 18 for control thereof.

As is well known in the art, the triac 16 is a gate controlled semiconductor device which permits current flow therethrough when the voltage on its gate exceeds a threshold value. Once the threshold has been exceeded, current continues to flow through the triac until the current reaches zero at which time conduction ceases until the gate threshold voltage is again exceeded.

Thus, voltage to the motor 14 is controlled by the operation of the triac 16 which, in turn, is controlled by the power factor circuit disclosed in FIG. 1 via gate 18. Of course, if desired, inverse parallel SCRs could be employed in place of the triacs illustrated as is well known in the art.

The line voltage is supplied to a voltage digitizing circuit 20. The voltage digitizer is in reality a squaring circuit. Thus, when the line voltage exceeds zero, a digital 1 is produced at 24 while a digital 0 is produced at 24 if the line voltage is less than or equal to zero.

A current digitizing circuit 22 is provided for similarly digitizing the current through the motor 14. The input to the digitizer 22 is taken from point T1 in the triac-motor circuit and represents the current flowing through the motor 14. Thus, when the motor current exceeds zero, a digital 1 is produced at 28 while a digital 0 is produced at 28 when the current is less than zero.

The output from the voltage digitizer 20 is a signal on line 24 which is high when the line voltage exceeds zero. The output from the digitizer on line 26 is the inverse of the information on line 24. Similarly, the outputs of the current digitizer 22 are provided on lines 28 and 30 as indicated in FIG. 1.

The four outputs from the digitizers are logically combined by means of AND gates 32 and 34 and OR gate 36 to produce the logical function $PF = \bar{E} \cdot I + E \cdot \bar{I}$. This function represents the phase relationship between voltage and current in the motor and provides the necessary information for phase control to maximize power factor. This signal is provided to a summing amplifier and low pass filter circuit indicated at 38. The other input to the circuit 38 is provided from a variable resistor 40 which provides a command or reference voltage signal to tune the circuit for the differences in power factor characteristics of different motors. The proportional signal on line 37 and the command signal on line 41 are summed by circuit 38 and the difference between the two voltages is an error signal provided on line 42.

Figure 4:
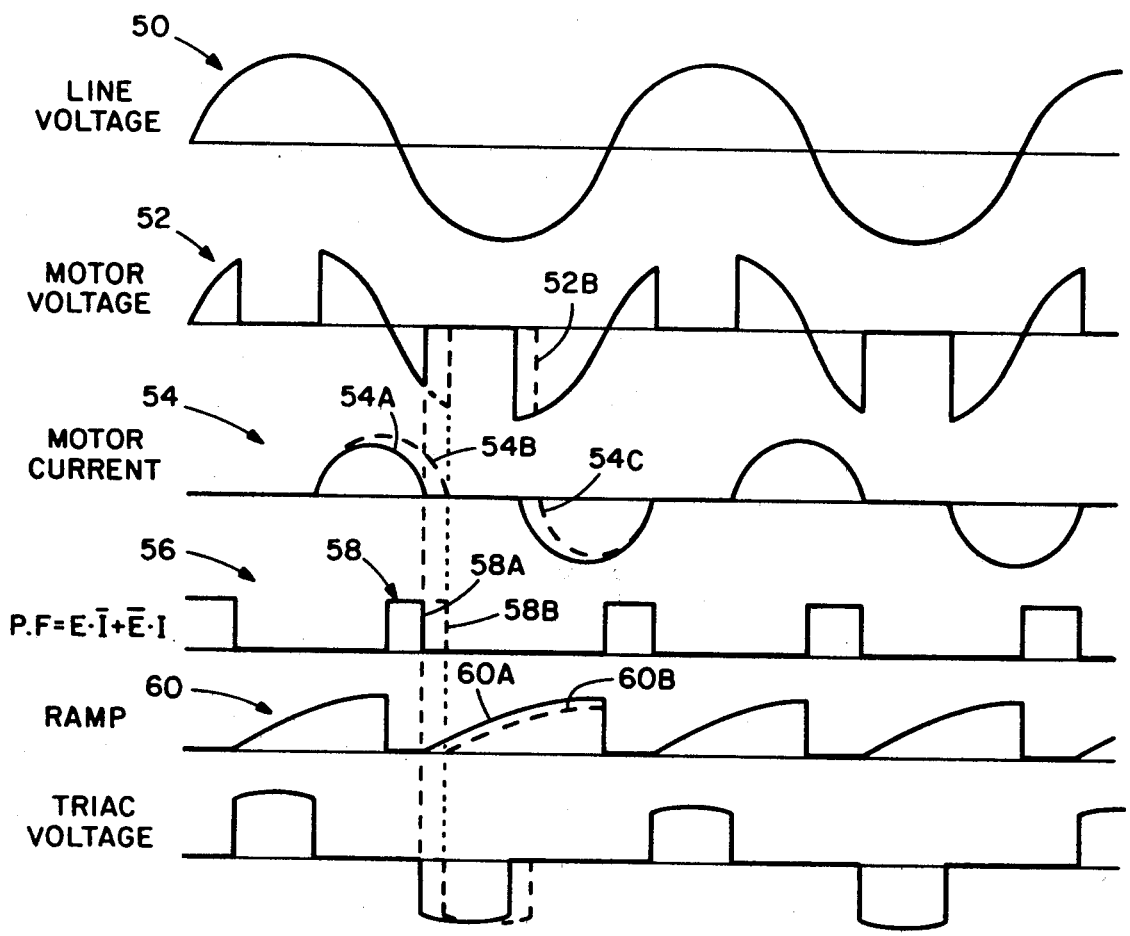
FIG. 4 is a timing diagram useful in explaining the unique features of the present invention which immunize the circuit from motor current variation.

The error signal is received by a comparator 44. A ramp generator 46 provides the other input to the comparator 44 via line 47. The ramp generator, as indicated in FIG. 4, produces a ramp which increases from zero to a maximum value in a nearly linear fashion after which it is reset until the next cycle of operation begins. Initialization or resetting of the ramp generator is controlled by the motor current waveform as will be described in connection with the detailed schematic of FIG. 5. In essence, however, the ramp generator 46 is initialized to zero. Subsequently, when the motor current passes through zero, it begins increasing in value as can be seen by reference to FIG. 4.

The output of the ramp generator on line 47 is compared against the error voltage on line 42 and when the comparator detects that the ramp signal has exceeded the error signal a firing pulse is produced which exceeds the gate voltage of the triac 16 thereby applying the line voltage to the motor. The point in time at which turn on occurs optimizes the power factor of the motor.

As indicated in the background portion of this specification, a principal problem with the control system of the prior art patent is the failure to successfully deal with the inherent current instability of an induction motor. With reference to FIG. 4, the manner in which the present invention deals with this problem can be understood. Waveform 50 represents the AC line voltage applied at terminals 10 and 12. Waveform 52 represents the portion of the line voltage which is applied to the motor as a result the control circuit according to the invention. Waveform 54 illustrates the current through the motor while waveform 56 shows the P.F. signal obtained from the OR gate 36. Finally, waveform 60 shows the ramp generated by the ramp generator 46 and its relationship to the motor current waveform 54.

With specific reference to waveforms 54 and 56 it will be seen that the waveforms are shown in both solid and dashed lines. This is to indicate that for a given motor voltage, variations in the motor current can occur. Thus, for a constant line voltage it is possible that the current would be as represented at 54A or at 54B. A change in the motor current has a corresponding effect upon the power factor waveform 56 and thus the square wave 58 will terminate at 58A in the case of current waveform 54A and at 58B in the case of waveform 54B.

Figure 5:
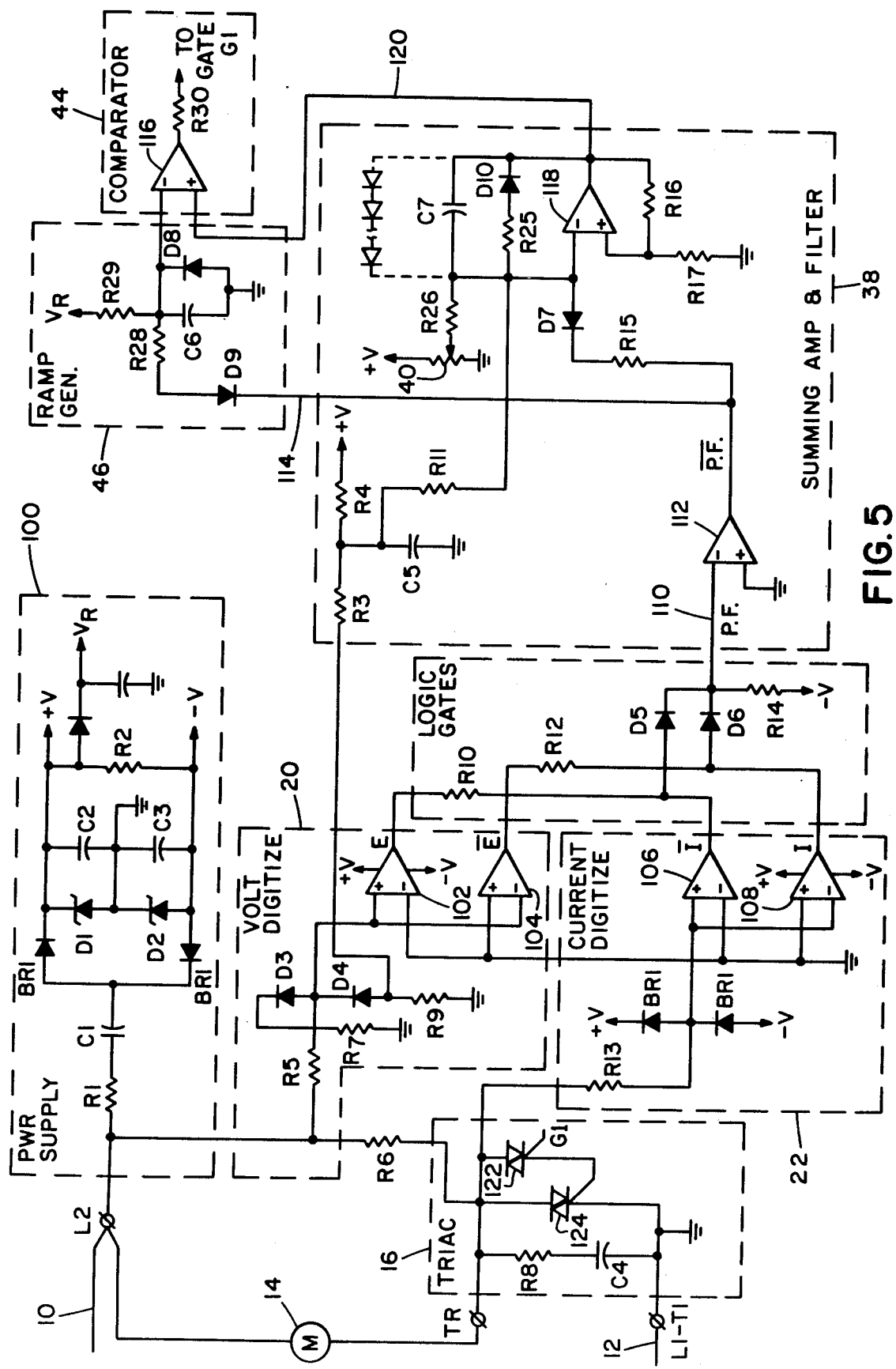
FIG. 5 is a detailed schematic diagram of the invention disclosed in FIG. 1.

As indicated in FIG. 5, the ramp waveform 60 is derived from the P.F. waveform which, in turn, is derived from the motor current waveform 54. The ramp waveform 60 is reset to zero each time the square wave pulse 58 goes high. It then begins charging up when the pulse 58 returns to zero. In the case of current waveform 54A this will result in generating ramp waveform 60A. In the case of current waveform 54B the ramp waveform is delayed with respect to the line voltage resulting in a ramp waveform 60B. This automatic correction is a particularly significant feature of the present invention. As indicated previously, this solves the problem of variation in motor current which avoids the instability, vibration, noise and high operating temperature problems which have nullified the energy savings of power factor control circuits.

Thus, for example, if the motor current increases as shown at 54B, it causes a delay in the turn on point of the next half cycle as shown at 52B of the motor voltage waveform yielding a smaller motor current as shown at 54C. This corrects the undesirable variation in current within a half cycle and maintains the motor power factor at the desired level without constantly correcting the error signal generated by the summing amplifier circuit 38.

Figure 3:
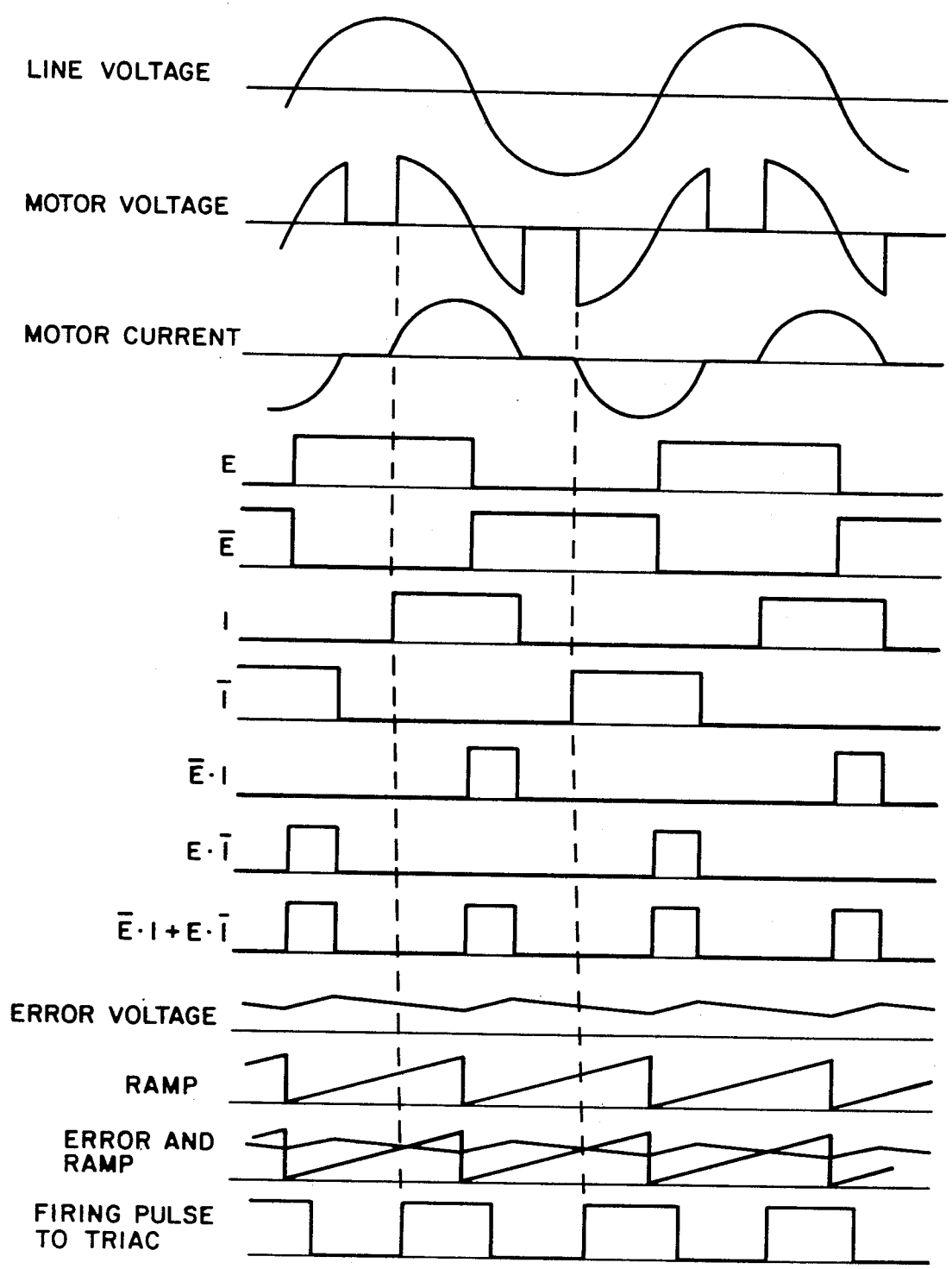
FIG. 3 is a timing diagram useful in understanding the operation of the prior art power factor control circuit disclosed in U.S. Pat. No. 4,052,648 and for contrasting the present invention therefrom.

The difference between the present invention and the prior art can be more thoroughly understood by comparing the waveforms of FIGS. 3 and 4. In the prior art system note that the ramp starts on the zero crossing of the line voltage rather than, as with the present invention, the zero crossing of the motor current.

Figure 2:
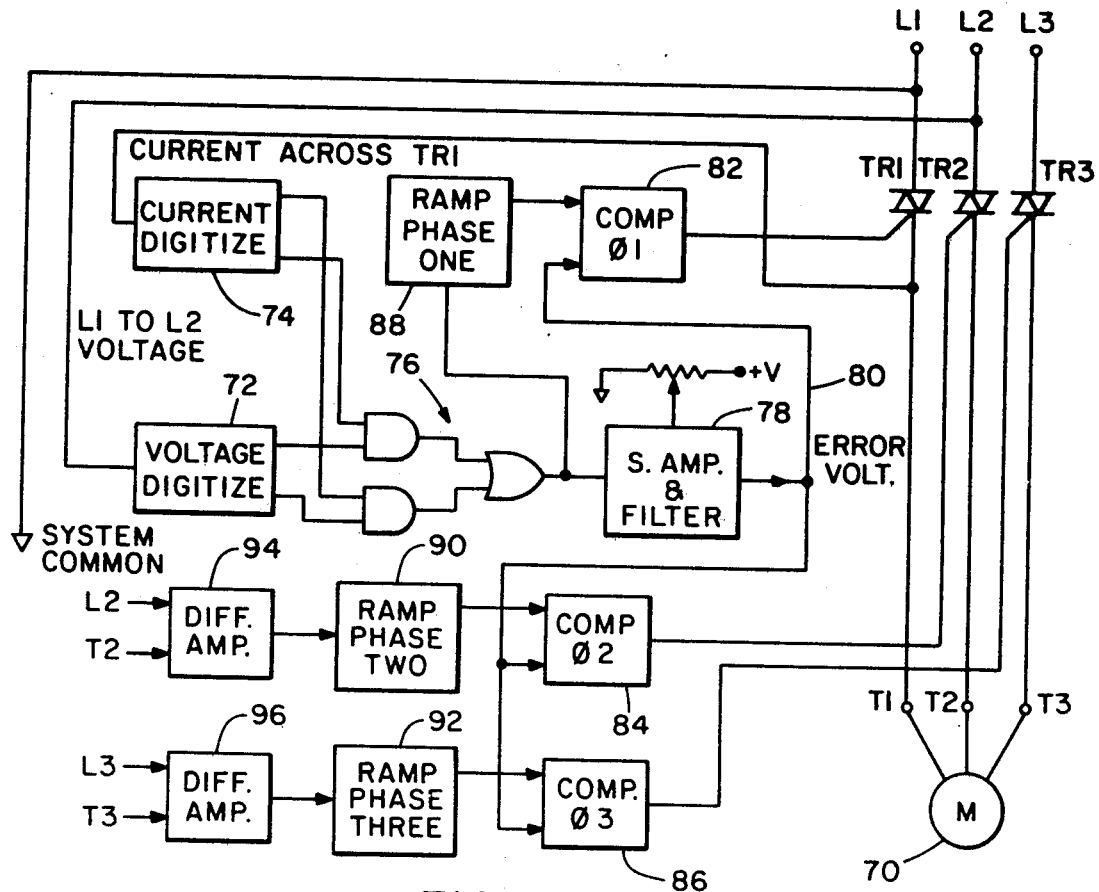
FIG. 2 is a block diagram disclosing an embodiment of the invention suitable for use with a three phase AC motor.

Referring to FIG. 2, there is disclosed a block diagram of a circuit according to the invention for use with a three phase motor. The system operates in essentially the same manner as the circuit of FIG. 1 with the exception of the portions now to be described. The motor 70 is connected to the three phase voltage via triacs TR1, TR2 and TR3. The phases are designated L1, L2 and L3 in the drawing. A voltage digitizer 72 receives the L1 to L2 voltage as its input and produces a square wave output which is positive when the voltage is greater than zero and zero when the voltage is less than or equal to zero. The current digitizer 74 measures the current through triac TR1 in the manner of the system disclosed in FIG. 1.

The outputs of the voltage and current digitizers 72 and 74 are provided to the AND/OR gate network indicated at 76 as with the FIG. 1 embodiment. The output of the gate network is provided to the summing amplifier and low pass filter 78 which produces an error voltage on line 80. The error voltage is provided to the comparator 82 for phase 1 and to comparators 84 and 86 for phases 2 and 3, respectively. A ramp is provided as a second input to comparator 82 from ramp generator 88 for phase 1. This ramp is initialized in the precise manner described in connection with the embodiment of FIG. 1, as illustrated in FIG. 4.

Ramp circuits 90 and 92 are provided for phases 2 and 3, respectively, and their outputs are provided as the second input to the comparators 84 and 86. The phase 2 and 3 ramps are initialized in a slightly different manner.

A difference amplifier, 94 in the case of phase 2, 96 in the case of phase 3, is used to detect the turn off of triac TR2 or TR3, respectively. When a triac turns off the corresponding ramp is generated. This is consistent with the principal of the invention that the ramp start when the current through the motor goes to zero. As is well known by those skilled in the art, a triac turns off when the current flow therethrough is zero. Since these triacs are in the motor current circuit for each phase they will turn off when the motor current is zero. Thus, the inputs to the difference amplifier 94 is taken across the triac TR2 at points L2 and T2 while difference amplifier 96 is connected across TR3 at L3 and T3.

The circuit of FIG. 2 is a preferred embodiment for 3 phase operation. If desired, however, it is possible to run all 3 voltages and currents back to the summing amplifier 78 but this is more costly as it requires additional circuitry.

Referring now to FIG. 5, a detailed schematic of the circuit of FIG. 1 is shown. For convenience, the circuits which represent the blocks of FIG. 1 are indicated within the dashed boxes. The power supply for the circuit is shown in the dashed box 100 and utilizes dual half wave rectifiers BR1 in conjunction with a regulated power supply constituted by D1, D2, C2 and C3. The necessary supply voltages are thus generated in a manner well known by those skilled in the art. Resistor R1 and capacitor C1 are a current limiting impedance for the power supply.

The voltage digitizing is accomplished by a pair of operational amplifiers 102 and 104. Amplifier 102 provides a positive output whenever the input voltage is greater than zero while amplifier 104 provides a positive output whenever the input voltage is less than or equal to zero. Resistors R5, R7 and R9 along with diodes D3 and D4 form a voltage clamp for the voltage digitizing circuit.

A similar block is provided for the current digitizing including a pair of operational amplifiers 106 and 108. The output of 106 is positive when the current through the triac is greater than zero while the output of 108 is positive when the triac current is negative. Resistor R13 and diodes BR1 provide a voltage clamp from the current squaring circuit.

The four outputs from the operational amplifiers are provided to the logic gates formed by resistors R10, R12 and R14 and diodes D5 and D6. These components form the AND/OR gate combination shown in FIG. 1 as gates 32, 34 and 36. The output from the gates on line 110 is the power factor function $\overline{E}.I + E.\overline{I}$.

An inverting amplifier 112 inverts the P.F. function and via line 114 it is supplied to the ramp generator circuit 46. Ramp generator 46 is formed by resistors R28 and R29, capacitor C6 and diodes D8 and D9. This is a standard ramp circuit well known by those in the art wherein current flows from the source $V_R$ through resistor R29 to the charge capacitor C6. When line 114 goes high capacitor C6 begins charging, initiating the ramp shown in FIG. 4.

The output of the ramp circuit is provided to the negative input of the comparator circuit which comprises operational amplifier 116 and resistor R30.

The other input to the comparator is derived from the summing amplifier and filter 38. This circuit employs an operational amplifier 118 having filter feedback elements R25, C7 and R16. The negative input of the amplifier is the summing point where the inverted power factor signal from line 110 is summed with the control voltage generated by the variable resistor 40. The difference is provided via line 120 to the positive input of the amplifier 116 of the comparator. Resistors R3, R4, C5 and R11 provide voltage regulation to maintain a constant motor voltage with respect to line voltage variations for this circuit. The feedback elements previously mentioned constitute the low pass filter portion of the circuit.

As stated in connection with FIG. 1, the output of the comparator circuit 44 is used to control the gate of the triac circuit 16. The triac circuit, in the illustrated embodiment, consists of a control triac 122 which, in turn, controls the operation of a high current triac 124. Resistor R8 and capacitor C4 constitutes a protective snubber circuit to limit dv/dt across triac 16 during turn off each half cycle.

The operational amplifiers utilized in the circuit of FIG. 5 are commercially available types. Thus, for example, amplifier 102, 104 and 118 may be Type 4741 manufactured, for example, by Motorola. Operational amplifiers 106, 108, 112 and 116 may be Type 3302 voltage comparators also manufactured by Motorola.

Figure 6:
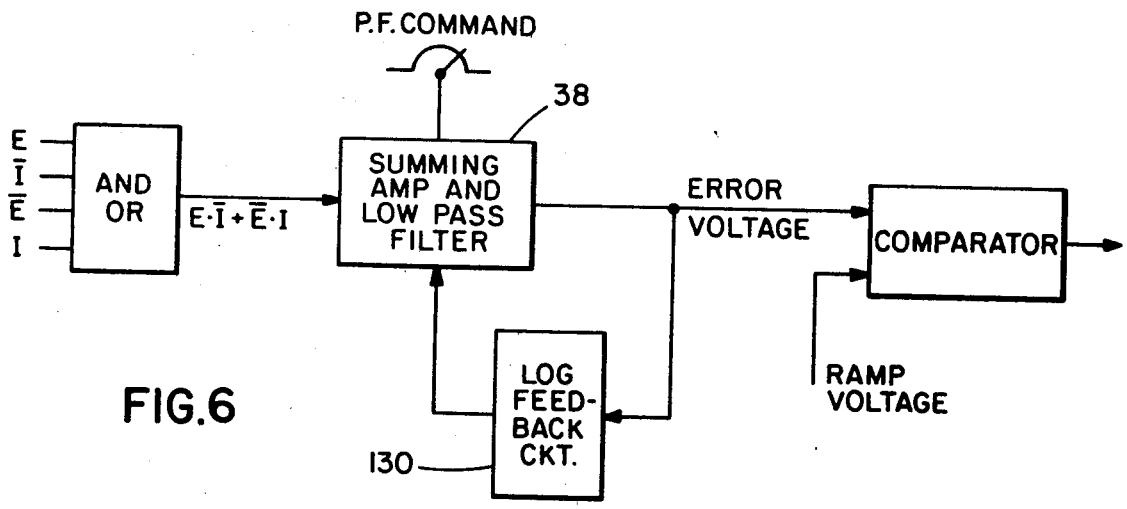
FIG. 6 is a block diagram of a modification of the FIG. 1 circuit employing a logarithmic feedback circuit to further optimize power factor control.
Figure 7C:
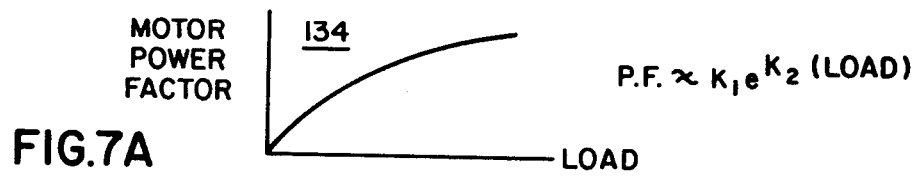
Figure 7C:
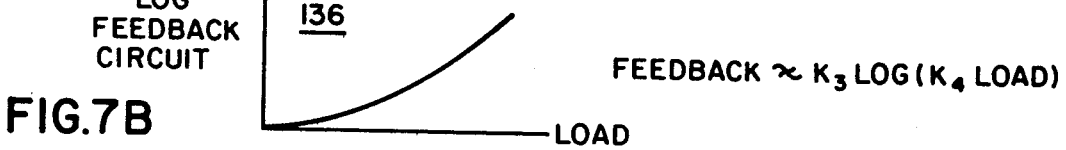
Figure 7C:
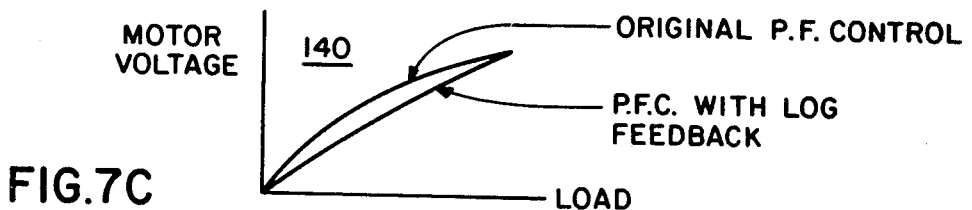
Figure 7D:
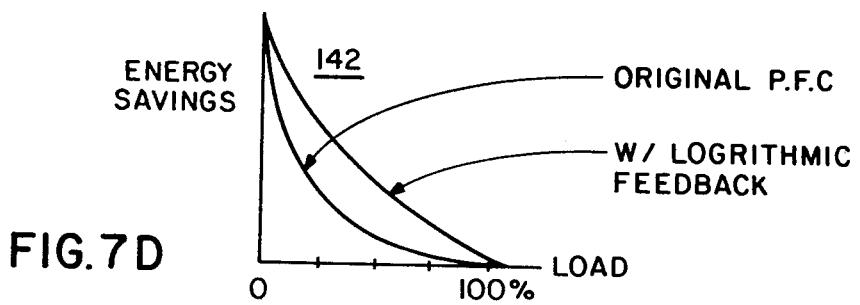

Referring now to FIGS. 6 and 7, an alternate embodiment of the FIG. 1 circuit is illustrated wherein increased energy savings are obtained. The circuit of FIG. 6 is identical to the circuit of FIG. 1 except that a logarithmic feedback circuit 130 has been provided for the summing amplifier 38. The feedback circuit, in the preferred embodiment, consists of semiconductor diodes connected in series from the output of the amplifier 118 to its negative input. This is indicated in phantom in FIG. 5. The number of diodes utilized is a function of magnitude of the ramp voltage and must be sufficient to flatten out the motor voltage versus load waveform 140 shown in FIG. 7C. For example, in the case of a ramp voltage of 4.5 volts, seven diodes would be required since each diode drops the voltage 0.7 volts.

Referring to FIG. 7, the benefits of the log feedback circuit 130 can be understood. A typical motor power factor is a logarithmic function varying with load. (See graph 134.) By use of a log feedback circuit having an inverse characteristic (graph 136) with respect to the power factor characteristic curve, it is possible to cause the motor voltage to increase in a more linear manner as shown in graph 140. This linearizing of the motor voltage reduces the power required by the motor under less than full load, as shown in waveforms 140 and 142, further increasing the energy savings produced by the power factor control circuit of the present invention.

Referring to waveform 142, the effect of linearizing the motor voltage waveform is illustrated. Energy savings versus load is significantly improved over the one-quarter to three-quarters load range.

Figure 8:
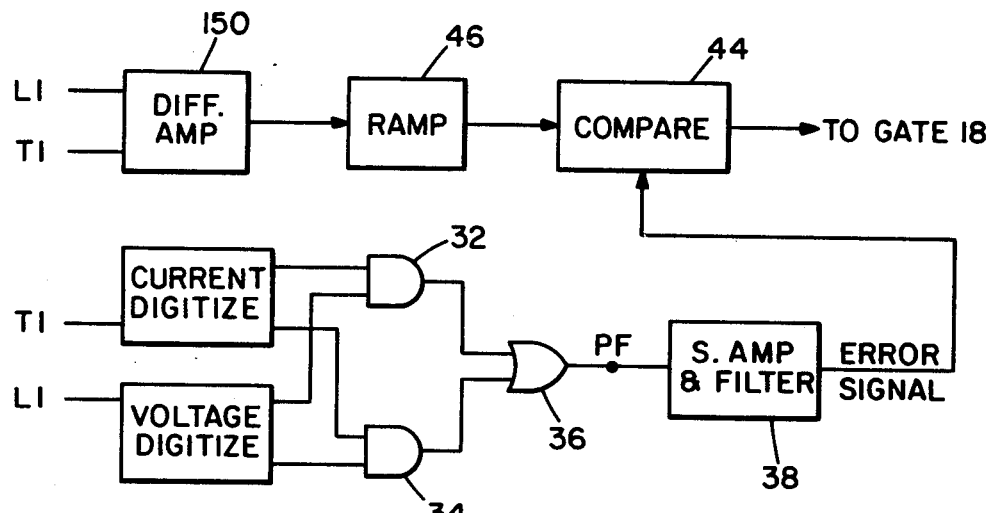
FIG. 8 is a second embodiment of the invention for use with single phase motors. This embodiment employs a differential amplifier to initiate operation of the ramp or control waveform.

Referring now to FIG. 8, a second embodiment of the invention is disclosed. This embodiment is similar to the embodiment of FIG. 1 and for convenience reference numerals of components which are the same have been carried over from FIG. 1. The FIG. 8 embodiment differs from the FIG. 1 embodiment in that the ramp generator 46 is controlled from a difference amplifier 150 instead of from the output of OR gate 36. Of course, both methods of controlling the ramp employ detecting when motor current goes to zero. In all other respects the circuit of FIG. 8 operates identically to the FIG. 1 circuit.

The advantage of the FIG. 8 circuit is that it has application to both single and three phase motors and, accordingly, is highly suitable for fabrication as a custom integrated circuit. Specifically, three identical circuits of the type shown in FIG. 8 would be provided in a custom integrated circuit chip. In the case of a single phase motor one of the circuits would be utilized, the remaining two circuits being disconnected. In the case of a three phase motor, all three circuits of the chip would be employed to control the motor. That is, each phase of the motor would be controlled by a separate circuit of the type shown in FIG. 8.

The FIG. 8 circuit can also be considered an alternate embodiment of the circuit shown in FIG. 2 in that current and voltage digitizing elements are provided for each of the three phases whereas in FIG. 2 such digitizing is provided only for one of the three phases. In the case where the FIG. 8 embodiment is used for a three phase system the error signal created by the digitizers and gate network 76 (FIG. 2) for each phase is fed to the amplifier and filter 78 and summed thereat to produce the error voltage used by each of the comparators 82, 84 and 86.

Figure 8A:
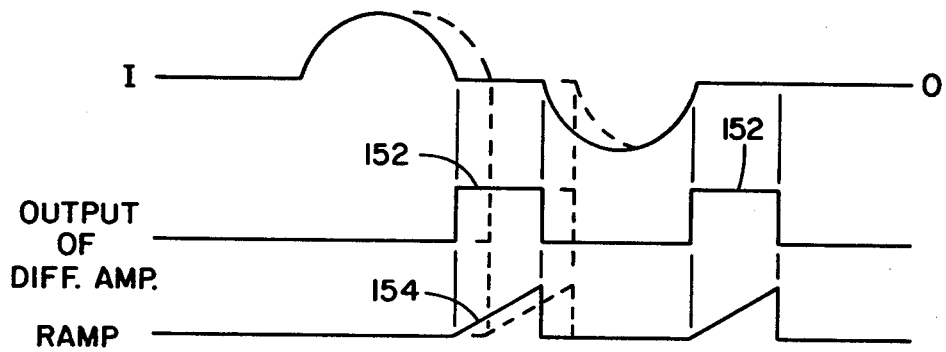
FIG. 8A is a waveform diagram useful in understanding the operation of the circuit of FIG. 8.

The inputs to the difference amplifier 150 are taken across the triac 16 as indicated by terminals L1 and T1 of FIG. 1. As shown in FIG. 8A, the output of the difference amplifier 150 goes positive when motor current goes to zero and remains positive until motor current is no longer zero. In the event of motor current instability, as indicated by the dashed lines, the output waveform 152 from the difference amplifier is advanced or delayed, as necessary, to automatically compensate. The differential amplifier output is utilized to initiate the ramp or control signal generator 46.

Figure 9:
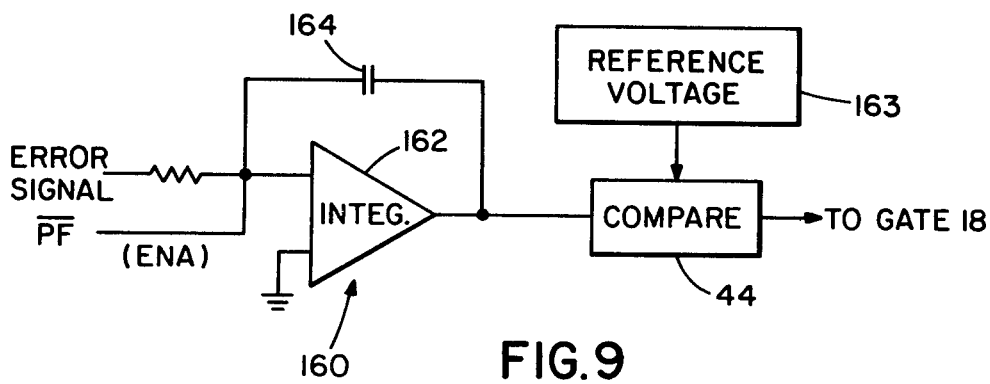
FIG. 9 is a third embodiment of the invention in which the ramp generator has been replaced with an integrating circuit producing a variable rate waveform.

Referring to FIG. 9, a third embodiment of the invention is disclosed in which the ramp generator 46 has been replaced with an integrator circuit 160 including an operational amplifier 162 and feedback capacitor 164. The input to the integrator is the error voltage produced by the summing amplifier 38 of FIG. 1. The $\overline{PF}$ signal is also provided as an input to the integrator and utilized as an enabling signal. The output of the integrator is provided to the comparator 44 which compares the instantaneous value of the integrator with a preset reference voltage indicated at 162. This embodiment of the invention may be characterized as employing a variable rate ramp as compared with the FIG. 1 embodiment which employs a variable error voltage in conjunction with a constant ramp.

In operation the $\overline{PF}$ signal maintains the integrator circuit in the reset condition until motor current goes to zero. When the $\overline{PF}$ signal goes high the integrator begins integrating the error voltage signal. As is well known by those skilled in the art, the rate of integration is a function of the magnitude of the error signal and thus the characterization of this circuit as a variable rate ramp. The output of the integrator will be a waveform having an increasing value which is compared against the reference voltage by comparator 44 and when the threshold is exceeded the triac gate 18 is operated as previously described.

Referring to FIG. 10, a further embodiment of the invention is disclosed in which the ramp generator and analog comparator of FIG. 1 have been replaced with digital equivalents. In the FIG. 10 embodiment the error voltage produced by the summing amplifier 38 of FIG. 1 is provided to a voltage controlled oscillator (VCO) 170, the output of which is provided to a digital counter 172. The counter is enabled by the $\overline{PF}$ signal from gate 36 (FIG. 1). The output of the counter is provided to a digital comparator 174 which compares it against a reference value indicated at 176. When the count in counter 172 exceeds the reference value, the triac gate 18 is operated. As with the FIG. 9 embodiment, this circuit employs a variable rate ramp as opposed to the FIG. 1 embodiment wherein a constant ramp is utilized and compared against the error voltage. In FIG. 10 the error voltage controls the frequency of operation of the oscillator 170 which, in turn, drives the counter 172. Thus, the time it takes for the counter 172 to reach the threshold value necessary to operate the gate is a function of the error voltage.

Referring to FIG. 11, a further embodiment of the invention is disclosed in which the ramp generator 46 and comparator 44 of the FIG. 1 embodiment are replaced with a fixed frequency oscillator 180 driving a digital counter 182, the output of which is provided to a digital comparator 184. The digital comparator compares the output of the counter against the digital value of the error voltage produced by summing amplifier 38. The error voltage is digitized by an A to D converter 186 in a conventional manner. The $\overline{PF}$ signal is used to enable the counter as indicated when motor current goes to zero.

In operation the circuit of FIG. 11 begins counting when enabled by the $\overline{PF}$ signal. It counts at a frequency determined by the oscillator 180 and its output is provided to the digital compartor 184. When the counter output exceeds the digitized value of the error voltage the triac gate 18 is operated. The FIG. 11 embodiment closely resembles the FIG. 1 embodiment constituting a digital equivalent thereof. Counter 182 corresponds to a constant rate ramp or control signal.

FIG. 12 discloses an embodiment of the invention in which a digital computer and read only memory are utilized in place of the ramp generator 46, summing amplifier 38 and comparator 44 of the FIG. 1 embodiment. In FIG. 12 a comparator 190, which suitably may be a commercially available microprocessor, receives the $\overline{PF}$ signal as an input. When the current has gone to zero the computer interrogates the read only memory 192 which is provided with a look up table containing the correct amount of delay for a given power factor signal. The computer receives the information from the read only memory, executes the appropriate delay and then enables the triac gate 18. The FIG. 12 embodiment eliminates the need for generating a ramp waveform or error signal as well as the need to compare the two signals to initiate operation of the triac. Its only input requirement is the $\overline{PF}$ signal or, alternatively, the output of the difference amplifier 150 in the FIG. 8 embodiment, both of which indicate when motor current goes to zero.

FIG. 13 is a flow diagram of the operation of the FIG. 12 embodiment. The computer reads the motor current information, looks up a corresponding delay time in the read only memory, executes the delay and then activates the gate 18.

In connection with generation of the power factor signal for the various embodiments, it will be recognized by those skilled in the art that very accurate control of the system can be obtained when the power factor information is derived from $E.\overline{I}+\overline{E}.I$. Thus, as shown in FIG. 4, a power factor signal is generated every half cycle. If desired, however, for less critical applications, the power factor signal can be derived from $E.\overline{I}$ alone or $\overline{E}.I$ alone. This would permit power factor correction once each cycle instead of each half cycle.

Referring to the final embodiment of the invention, FIG. 14 discloses a modification to the FIG. 1 system in which polarity is not detected to generate the power factor signal. Instead of current digitizing elements 20 and 22 of FIG. 1 and the gates 32–36, a pair of difference amplifiers 100 and 102 are provided. Amplifier 100 produces an output therefrom when the current through the motor is not zero. Conversely, amplifier 102 produces an output therefrom when the line voltage is zero. The outputs from the amplifiers are provided to an AND gate 104, the output of which is provided to the set input of an R-S type flipflop 106. The output of amplifier 100 is also provided to the reset input of flipflop 106. As indicated in FIG. 14, when the condition specified by the gate 104, namely $\overline{E}.I$ is true, flipflop 106 is set causing its Q output to go high producing a power factor signal once each cycle of the line voltage. When the current is no longer zero the flipflop is reset by the output from amplifier 100 as required. An alternate possibility is to utilize the other portion of the power factor equation, namely, $E.\overline{I}$ and the difference amplifiers can be set for that purpose if so desired or gating could be provided to utilize both conditions to produce the waveform 56 shown in FIG. 4.

The FIG. 14 embodiment differs from the FIG. 1 embodiment in that polarity of the voltage and current are not utilized to generate the power factor waveform. Instead the zero crossing condition is detected which equates to the power factor waveform as long as the circuit does not lose track of the correct relationship between voltage and current (for inductive loads such as motors, voltage leads current). The flipflop insures against this possibility. The circuit of FIG. 14 may be utilized in conjunction with the ramp 46 and summing amplifier 38 of FIG. 1 or in conjunction with the FIG. 8 embodiment in place of the current and voltage digitizers and gates 32 through 36.

While I have shown and described embodiments of this invention in some detail, it will be understood that this description and illustrations are offered merely by way of example, and that the invention is to be limited in scope only by the appended claims.

I claim:
1. A power factor control circuit for a motor operated by an AC line voltage comprising:
   (a) means for monitoring the polarity of the line voltage and producing first output signals indicative thereof;
   (b) means for monitoring the motor current and producing second output signals indicative of the polarity of the mtor current and when motor current goes to zero;
   (c) means utilizing said first and second signals for producing an error signal representative of the phase difference between the line voltage and the motor current;
   (d) means for initiating a control signal when motor current or its derivative, power factor goes to zero;
   (e) means for applying the line voltage to said motor when the magnitude of said control signal exceeds the magnitude of said error signal;
   whereby the power factor of the motor is optimized for any given load condition and the inherent instability of the motor current is automatically compensated for by delaying the initiation of the control signal if motor current increases or accelerating the start of the control signal if motor current decreases.

2. The circuit of claim 1 wherein said applying means includes:
   (a) a controllable semiconductor switch in circuit with said motor for selectively applying said line voltage to said motor;
   (b) means for comparing the magnitude of said error voltage with said control signal and controlling said switch in accordance with said comparison.

3. The circuit of claim 2 wherein said semiconductor switch is a triac, the gate electrode of which is controlled by said comparing means.

4. The circuit of claim 2 wherein said comparing means is an operational amplifier.

5. The circuit of claim 1 wherein said line voltage monitoring means is a digitizing circuit which produces a first logic level when the line voltage is greater than zero and a second logic level otherwise.

6. The circuit of claim 1 wherein said motor current monitoring means is a digitizing circuit which produces a first logic level when the motor current is greater than zero and a second logic level otherwise.

7. The circuit of claim 1 wherein said utilizing means includes means for linearizing the change in motor voltage as a function of load thereby to enhance the energy savings obtained by said circuit.

8. The circuit of claim 1 wherein said utilizing means includes:
   (a) logic gates for combining said first and second signals to produce a power factor function representative of the phase difference between motor current and line voltage;
   (b) means for summing the power factor function with a control voltage to produce said error signal.

9. The circuit of claim 8 wherein said summing means includes a feedback circuit having a logarithmic characteristic, as a function of load, which is of opposite slope to the logarithmic characteristic of the power factor waveform as a function of load thereby linearizing the change in motor voltage as a function of load to enhance energy savings.

10. The circuit of claim 9 wherein said feedback circuit consists of a plurality of diodes connected in feedback relation to said summing means.

11. The circuit of claim 8 wherein said summing means is an operational amplifier.

12. The circuit of claim 1 wherein said control signal initiating means is a charging circuit which initiates charging each time the motor current goes to zero.

13. A power factor control circuit for a motor operated by a three phase AC line voltage comprising:
   (a) means for monitoring the polarity of one phase of the line voltage and producing first output signals indicative thereof;
   (b) means for monitoring the motor current for said one phase and producing second output signals indicative of the polarity of the motor current;
   (c) means utilizing said first and second signals for producing an error signal representative of the phase difference between the line voltage and the motor current for said one phase;
   (d) means for generating a control signal for a given phase when motor current or its derivative, power factor for such phase goes to zero;
   (e) means for applying the line voltage for a given phase to said motor when the magntiude of the control signal for a given phase exceeds the magnitude of said error signal;
   whereby the power factor of the motor is optimized for any given load condition and the inherent instability of the motor current in each phase is automatically compensated for by delaying the initiation of the control signal if motor current increases or accelerating the start of the control signal if motor current decreases.

14. The circuit of claim 13 wherein said utilizing means includes means for linearizing the change in motor voltage as a function of load thereby to enhance the energy savings obtained by said circuit.

15. The circuit of claim 13 wherein said utilizing means includes:
   (a) logic gates for combining said first and second signals to produce a power factor function representative of the phase difference between motor current and line voltage;
   (b) means for summing the power factor function with a control voltage to produce said error voltage.

16. The circuit of claim 15 wherein said summing means includes a feedback circuit having a logarithmic characteristic, as a function of load, which is of opposite slope to the logarithmic characteristic of the power factor waveform as a function of load thereby linearizing the change in motor voltage as a function of load to enhance energy savings.

17. The circuit of claim 16 wherein said feedback circuit consists of a plurality of diodes connected in feedback relation to said summing means.

18. A power factor control circuit for a motor operated by an AC line voltage comprising:
   (a) means for monitoring the polarity of the line voltage and producing first output signals indicative thereof;
   (b) means for monitoring the motor current and producing second output signals indicative of the polarity of the motor current and when motor current goes to zero;
   (c) means utilizing said first and second signals for producing an error signal representative of the phase difference between the line voltage and the motor current;
   (d) means for generating a control signal when motor current or its derivative, power factor goes to zero;
   (e) means for comparing said control signal and said error signal for producing a firing signal effective to control the voltage applied to the motor;
   whereby the power factor of the motor is optimized for any given load condition and the inherent instability of the motor current is automatically compensated for by delaying the initiation of the control signal if motor current increases or accelerating the start of the control signal if motor current decreases.

19. A power factor control circuit for a motor operated by an AC line voltage comprising:
   (a) means for measuring power factor including detecting when motor current goes to zero and producing a first signal representative thereof,
   (b) means using said first signal to produce an error signal which is a function of phase difference between line voltage and motor current,
   (c) means generating a control signal when motor current or its derivative, power factor goes to zero,
   (d) means for comparing said control signal and said error signal for producing a firing signal effective to control the voltage applied to the motor, whereby the power factor of the motor is optimized for any given load condition and the inherent instability of the motor current is automatically compensated for by delaying initiation of the control signal if motor current increases or accelerates the start of the control signal if motor current decreases.

20. The circuit of claim 18 or claim 19 further including means for applying the line voltage to said motor responsive to said firing signal.

21. The circuit of claim 20 wherein said applying means is a triac.

22. A power factor control circuit for a motor operated by an AC line voltage comprising:
(a) means for detecting when motor current goes to zero,
(b) means for measuring power factor and providing a first signal representative thereof,
(c) means using said first signal to produce an error signal which is a function of phase difference between line voltage and motor current,
(d) means generating a control signal when motor current or its derivative, power factor goes to zero,
(e) means responsive to said control and error signals for controlling the voltage applied to the motor, whereby the power factor of the motor is optimized for any given load condition and the inherent instability of the motor current is automatically compensated for by delaying initiation of the control signal if motor current increases or accelerates the start of the control signal if motor current decreases.

23. The circuit of claim 22 further including means for applying the line voltage to said motor responsive to said firing signal.

24. The circuit of claim 23 wherein said applying means is a triac.

25. The circuit of claim 22 wherein said means for measuring power factor includes means for monitoring the polarity of the line voltage and the motor current.

26. The circuit of claim 22 wherein said means for producing an error signal is a summing amplifier.

27. The circuit of claim 22 wherein said control signal generating means is a ramp generator.

28. The circuit of claim 22 wherein said means for controlling the voltage applied to the motor is a comparator.

29. The circuit of claim 22 wherein said means for detecting when motor current goes to zero is a difference amplifier monitoring the current through one phase of said motor.

30. The circuit of claim 22 wherein said control signal generating means is an integrator circuit which produces said control signal as a function of said error signal when enabled by said first signal.

31. The circuit of claim 30 wherein said means for controlling the voltage applied to the motor is a comparator which compares said control signal against a reference voltage.

32. The circuit of claim 22 wherein said control signal generating means includes:
(a) a variable frequency oscillator, the output frequency of which is selected by the value of said error signal;
(b) a digital counter which counts the output from said oscillator when enabled by said first signal, the counter output constituting said control signal.

33. The circuit of claim 32 wherein said means for controlling the voltage applied to the motor is a digital comparator which compares said control signal against a reference value.

34. The circuit of claim 22 wherein said control signal generating means includes:
(a) a fixed frequency oscillator;
(b) a digital counter which counts the output from said oscillator when enabled by said first signal, the output of said counter constituting said control signal.

35. The circuit of claim 34 wherein said means for controlling the voltage applied to the motor includes a digital comparator which compares the output of said counter with said error signal.

36. The circuit of claim 35 wherein said means for controlling the voltage applied to the motor further includes an A to D converter for converting the error signal from analog to digital format.

37. The circuit of claim 22 wherein said power factor measuring means includes a pair of difference amplifiers, the outputs of which are provided to a binary storage device, the output of said storage device providing said first signal, said difference amplifiers measuring line voltage and motor current values, respectively.

38. A power factor control circuit for a motor operated by an AC line voltage comprising:
(a) means for measuring power factor and when motor current or its derivative, power factor goes to zero providing a first signal representative thereof,
(b) computer means using said first signal to determine the magnitude of the phase difference between line voltage and motor current and for controlling the voltage applied to the motor as a function thereof;
whereby the power factor of the motor is optimized for any given load condition and the inherent instability of the motor current is automatically compensated for.

39. The circuit of claim 38 wherein said computer means includes a microprocessor and a read only memory, the latter having data for calculating the magnitude of the phase difference and a corresponding delay period after which voltage is applied to said motor.

* * * * *